United States Patent [19]

Nayak

[11] 3,798,993

[45] Mar. 26, 1974

[54] CONTROL MECHANISMS

[75] Inventor: Ashok B. Nayak, El Monte, Calif.

[73] Assignee: Bell & Howell Company, Chicago, Ill.

[22] Filed: Dec. 29, 1972

[21] Appl. No.: 319,576

[52] U.S. Cl. .................................. 74/435, 74/405
[51] Int. Cl. ...................... F16h 55/04, F16h 57/00
[58] Field of Search ............................. 74/435, 405

[56] References Cited
UNITED STATES PATENTS
3,661,339   5/1972   Shimizu .............................. 74/435

Primary Examiner—Leonard H. Gerin
Attorney, Agent, or Firm—Benoit Law Corporation

[57] ABSTRACT

Apparatus for selectively transmitting mechanical power have a first gear wheel and a second gear wheel. The second gear wheel has a tooth-free portion and is mounted adjacent the first gear wheel for meshing engagement. An actuable lever is mounted on the second gear wheel for selectively bringing the second gear wheel into meshing engagement with the first gear wheel. Extensions of this concept involving further gear wheels with tooth-free portions and sensing and control equipment employing this concept are also disclosed.

21 Claims, 9 Drawing Figures

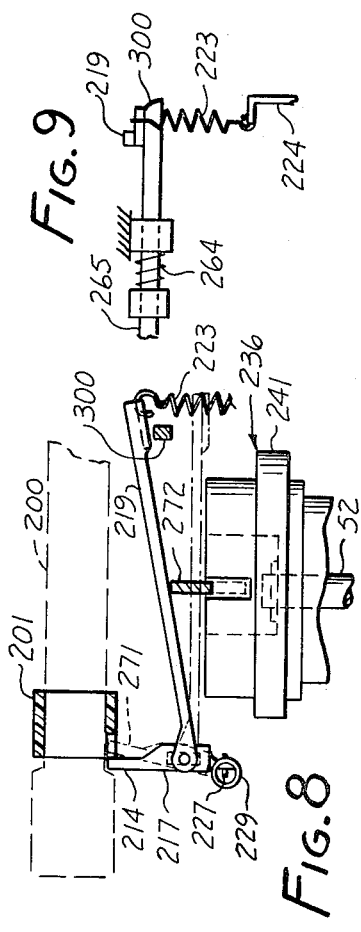
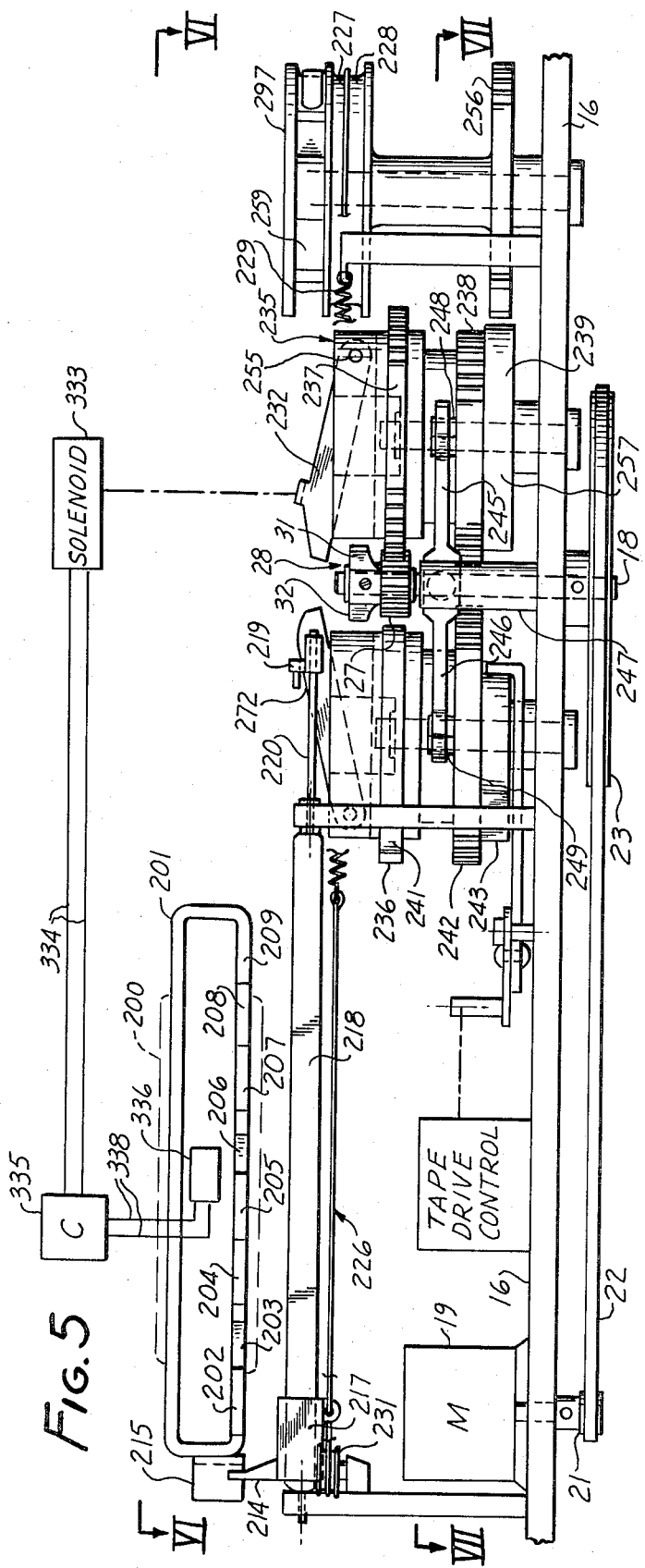

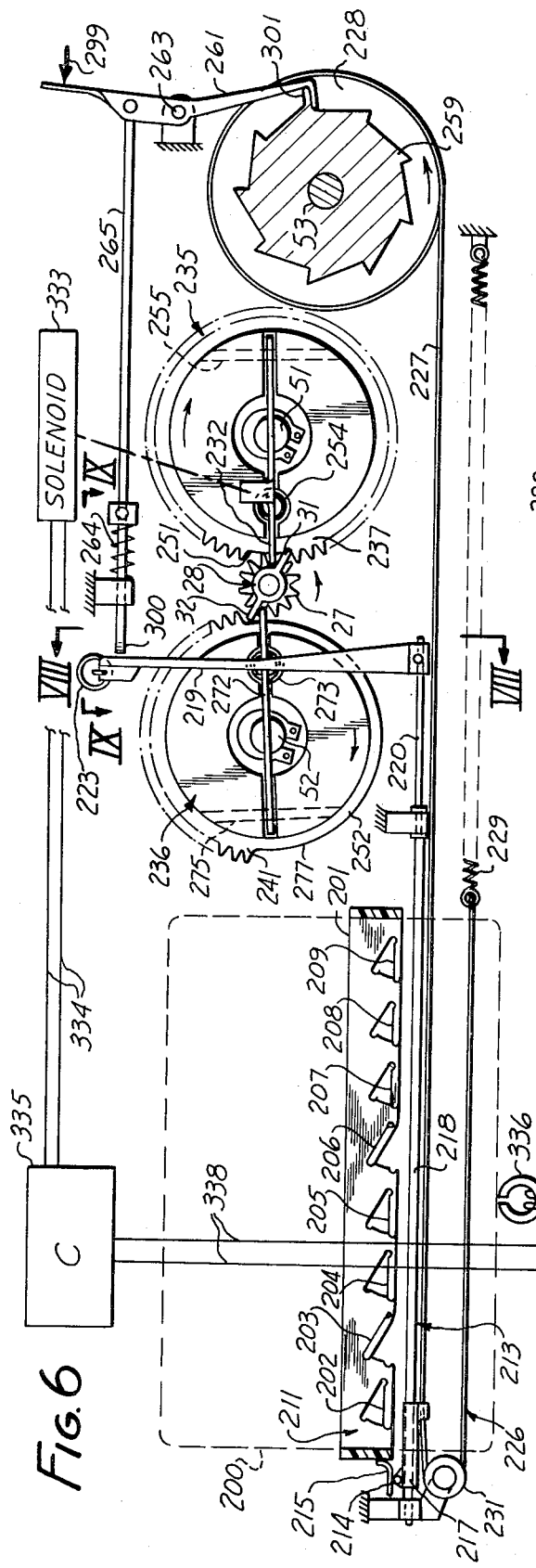
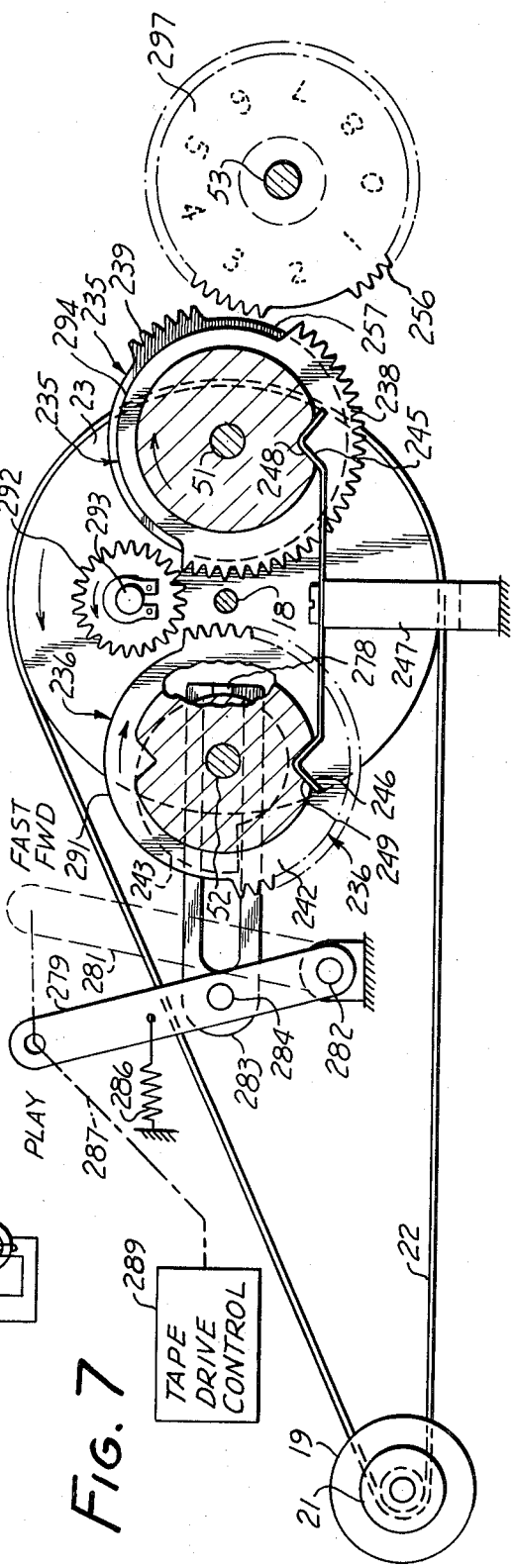
Fig. 6
Fig. 7

3,798,993

CONTROL MECHANISMS

CROSS-REFERENCE

The following are related in subject matter to the present patent application, are assigned to the same assignee as the present patent application, and are herewith incorporated by reference herein:

U.S. Pat. No. 3,601,554, by Arthur Rak, issued Aug. 24, 1971;

U.S. Pat. No. 3,601,555, by Peter G. Peterson, issued Aug. 24, 1971;

U.S. Pat. No. 3,601,556, by Dexter P. Cooper, Jr. and Arthur Rak, issued Aug. 24, 1971; and U.S. Pat. application Ser. No. 127,263, filed Mar. 23, 1971, by Leonard A. Ferrari, now U.S. Pat. No. 3,723,666.

BACKGROUND OF THE INVENTION

1. Field of the Invention

The subject invention relates to mechanisms, apparatus for selectively transmitting mechanical power, remote controls, and sensing and control equipment.

2. Description of the Prior Art

Prior-art gear mechanisms for selectively transmitting mechanical power typically had gear teeth distributed over the entire circumference of each gear wheel. Additional gear wheels and/or gear wheel shifting mechanisms or clutches were employed for the selective transmission and interruption of mechanical power. These additional means increased the complexity and cost of the mechanism.

Moreover, because of the complexities and other inadequacies of remote control and/or sensing mechanism, modern remote control and/or sensing systems typically do not principally rely on the operation of gear mechanisms.

SUMMARY OF THE INVENTION

It is an object of this invention to overcome the above mentioned disadvantages.

It is an object of this invention to provide mechanisms for selectively transmitting mechanical power.

It is an object of this invention to provide remote control mechanisms.

It is an object of this invention to provide position sensing mechanisms.

Other objects of this invention will become apparent from the subject disclosure.

From one aspect thereof, this invention resides in apparatus for selectively transmitting mechanical power, comprising, in combination, a first gear wheel, a second gear wheel having a tooth-free portion, means for driving the first gear wheel, means for deriving mechanical power from the second gear wheel, means for mounting the second gear wheel adjacent the first gear wheel for meshing engagement, and actuable means for selectively bringing the second gear wheel into meshing engagement with the first gear wheel, said actuable means including means for selectively coupling the second gear wheel to said means for driving the first gear wheel.

From another aspect thereof, this invention resides in apparatus for selectively transmitting mechanical power, comprising, in combination, a first gear wheel, a second gear wheel having a tooth-free portion, a third gear wheel having a tooth-free portion, means for driving the first gear wheel, means for deriving mechanical power from the second gear wheel, means for deriving mechanical power from the third gear wheel, means for mounting the second gear wheel adjacent the first gear wheel for meshing engagement of the second gear wheel with the first gear wheel, means for mounting the third gear wheel adjacent the first gear wheel for meshing engagement of the third gear wheel with the first gear wheel, first actuable means for selectively bringing the second gear wheel into meshing engagement with the first gear wheel, second actuable means for selectively bringing the third gear wheel into meshing engagement with the first gear wheel, and means coupled between said second and third gear wheels for selectively transmitting mechanical power between said second and third gear wheels.

The expression "power" as herein employed is not intended to limit the scope of this invention to any particular field, such as fields concerned with the transmission of large energies.

BRIEF DESCRIPTION OF THE DRAWINGS

The invention will become more readily apparent from the following detailed description of preferred embodiments thereof, illustrated by way of example in the accompanying drawings, in which like reference numerals designate like or functionally equivalent parts, and in which:

FIG. 5 is a side view of a control mechanism in accordance with a second preferred embodiment of the subject invention;

FIG. 6 is a view taken on the line VI — VI in FIG. 5;

FIG. 7 is a view taken on the line VII — VII in FIG. 5;

FIG. 8 is an illustration of a detail taken on the line VIII — VIII in FIG. 6; and FIG. 9 is an illustration of a detail taken on the line IX — IX in FIG. 6.

DESCRIPTION OF PREFERRED EMBODIMENTS

The drawings illustrate apparatus for selectively transmitting mechanical power. By way of example, and according to the drawings, these apparatus operate as control mechanisms.

Figure 1:
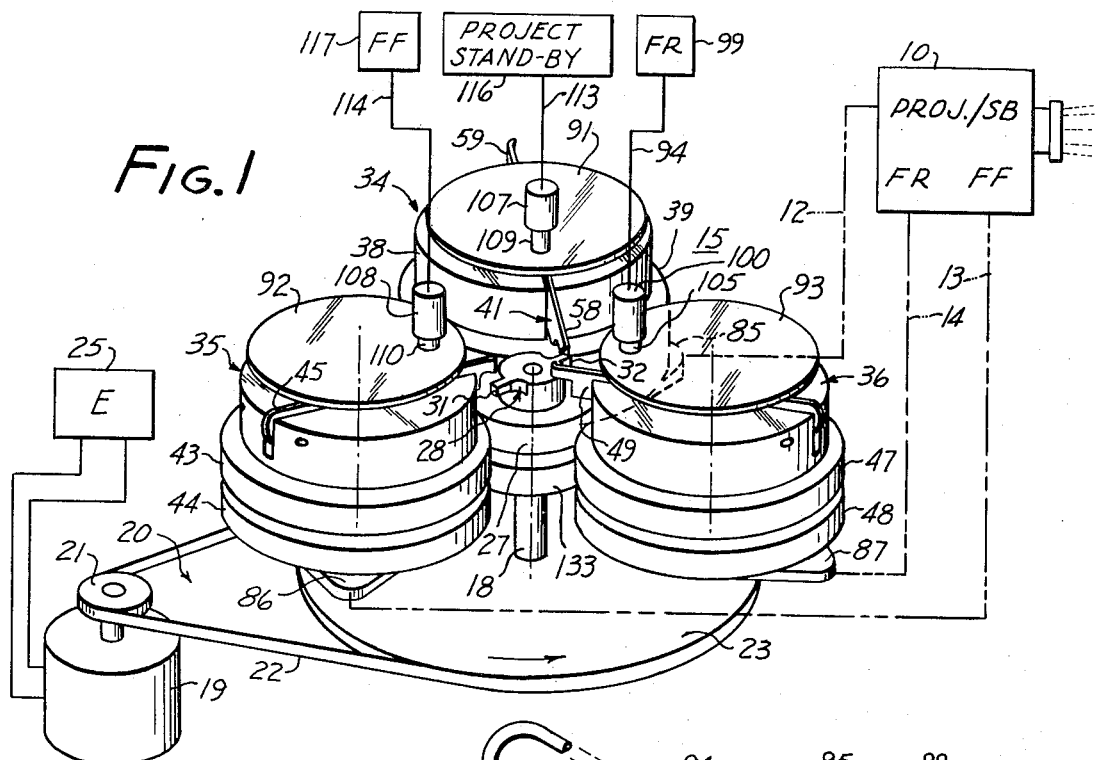
FIG. 1 is a perspective view of a control mechanism in accordance with a first preferred embodiment of the subject invention.

For instance, the embodiment shown in FIGS. 1 to 4 operates as a control mechanism for a motion picture projector diagrammatically shown in FIG. 1 at 10. In accordance with conventional practice the projector 10 is actuable into a standby mode, into a project mode, into a fast forward mode, and into a fast reverse mode. In the standby mode, the projector motor is running but the motion picture film is at a standstill. In the project mode, the projector lamp is lit and the motion picture film is advanced by the projector motor and the motion pictures are displayed on a suitable screen. In the fast forward mode, the motion picture film is advanced rapidly in a forward direction. In the fast reverse mode, the motion picture film is advanced rapidly in a backward direction. In lieu of the fast reverse mode, for instance, a reverse display mode may be provided to permit motion picture features to be displayed backwardly. All these features of the projector 10 are conventional and are typically brought into play by actuating various levers and gears on the motion picture projector. Accordingly, the motion picture projector as such is not shown in detail in the drawings. Rather, a fantom line 12 is shown for indicating conventional means for actuating the projector 10 between the standby and project modes. A fantom line 13 symbolizes conventional means for actuating the projector 10 into the fast forward mode, and a fantom line 14 symbolizes conventional means for actuating the projector 10 into a fast reverse mode.

Figure 3:
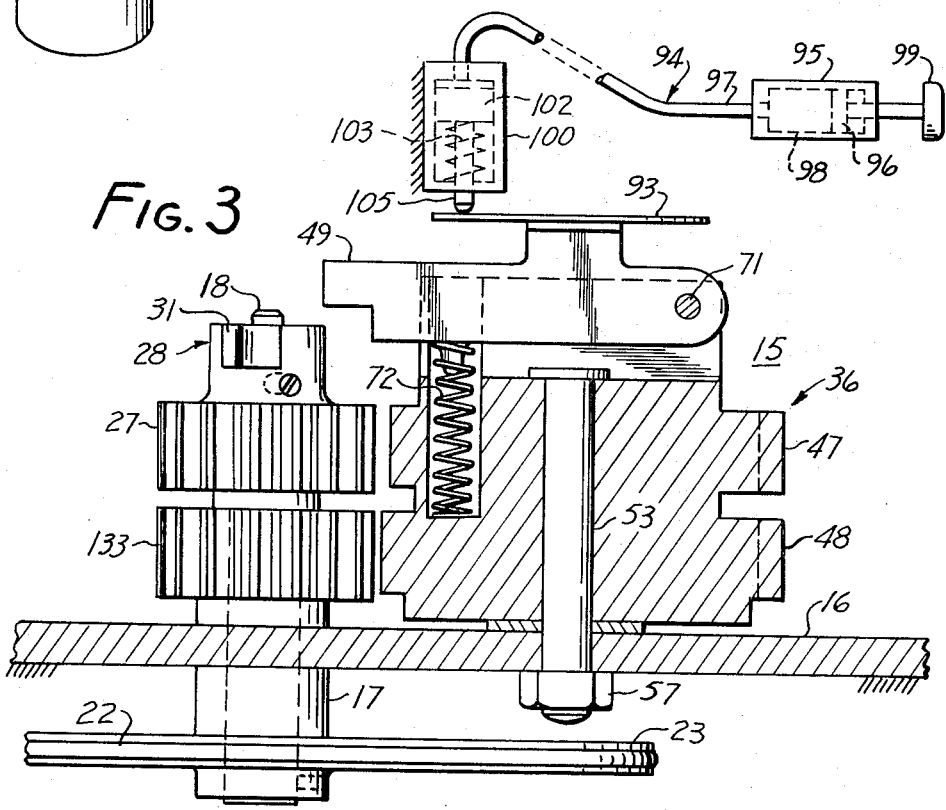
FIG. 3 is a view taken on the line III — III in FIG. 2.
Figure 4:
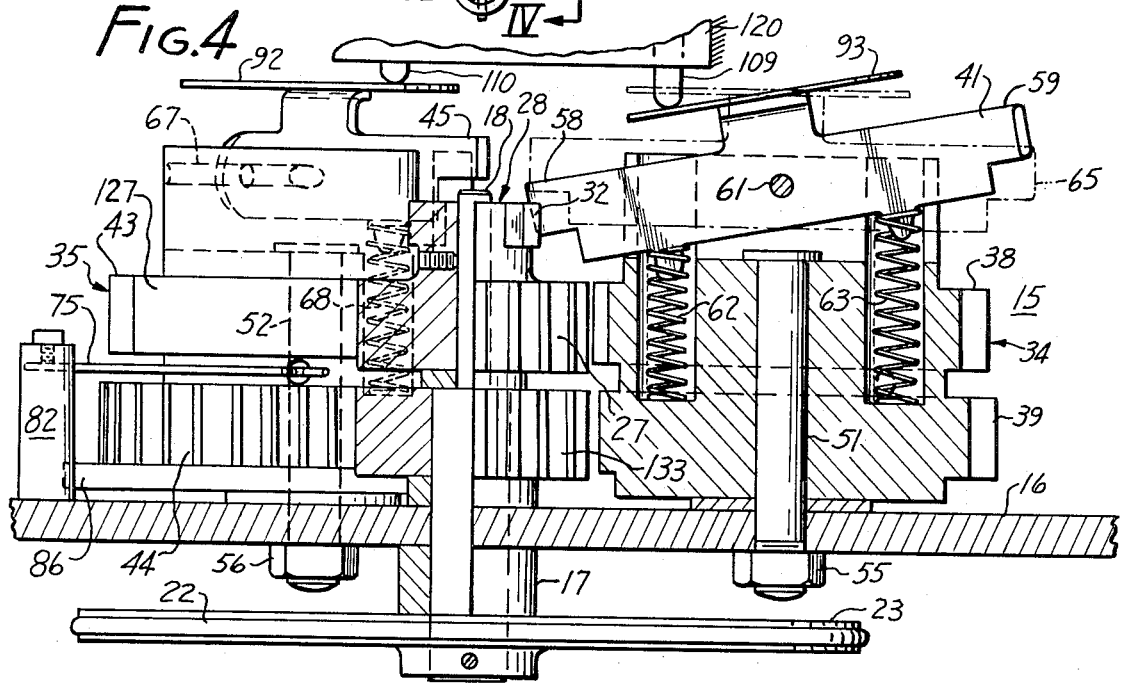
FIG. 4 is a view taken on the line IV — IV in FIG. 2.

The control apparatus 15 shown in FIGS. 1 to 4 has a base 16 which, for increased clarity, is only shown in FIGS. 3 and 4. The base 16 carries a bearing 17 in which a shaft 18 is rotatably mounted.

As seen in FIG. 1, the shaft 18 is driven by a motor 19 by way of a transmission 20 including a pulley 21, a belt 22 and a pulley 23. The motor 19 is energized from an electrical power source 25. By way of example, the motor 19 may be an electrical projector motor which may also drive the film advance mechanicam.

A driver gear 27 and an actuator 28 are mounted on the shaft 18 and are continuously rotated by the energized motor 19. In the illustrated preferred embodiment, the driver gear 27 has gear teeth over its entire circumference, and the actuator 28 has two diagrammatically opposed wings 31 and 32.

The control mechanism 15 according to the preferred embodiment shown in FIGS. 1 to 4 has three gear wheel sets 34, 35 and 36. The set 34 has a pair of gear wheels 38 and 39 and a control lever 41. Similarly, the set 35 has a pair of gear wheels 43 and 44 and a control lever 45. The set 36 has a pair of gear wheels 47 and 48 and a control lever 49. Levers 41, 45, and 49 are guided in slots.

The gear wheel sets 34, 35 and 36 are rotatably mounted on posts 51, 52 and 53, respectively, which are threaded into the baseplate 16 and which are locked against rotation by locking nuts 55, 56 and 57. The gear wheels of each set 34, 35 and 36 form an integral unit which rotates about the associated posts 51, 52 and 53, respectively.

The lever 41 of the set 34 has two extremities 58 and 59. The lever 41 is centrally pivoted by a pin 61 held by the integral unit of which the gear wheels 38 and 39 are formed. This unit has cavities which accommodate a pair of springs 62 and 63. These springs cooperate in biasing the lever 41 into a normal mid-position indicated in dotted outline at 65 in FIG. 4. In that rest position, the lever 41 occupies a level out of reach of the actuator 28.

The lever 45 is mounted at one end thereof by a pin 67 which is inserted in the integral unit of which the gear wheels 34 and 44 of the set 35 are formed. A cavity in that integral unit accommodates a spring 68 which biases the lever 45 out of reach of the actuator 28. Similarly, the lever 49 is pivotally mounted at one end by a pin 71 which is inserted into the integral unit of which the gear wheels 47 and 48 of the set 36 are formed. That unit has a cavity which accommodates a spring 72 which biases the lever 49 out of reach of the actuator 28.

A number of detents 74, 75 and 76 (see FIG. 2) cooperate with cavities 77, 78 and 79 in releasably retaining the gear wheel sets 34, 35 and 36, respectively in rest positions. The detents 74, 75 and 76 are mounted on posts 81, 82 and 83, respectively, which, in turn, are mounted on the baseplate 16.

Each gear wheel set 34, 35 and 36 has a cam 85, 86 and 87, respectively, associated therewith. Each of these cams is integral with or rigidly connected to the gear wheels with which it is associated. The cams 85, 86 and 87 serve to transmit power away from the gear wheel sets 34, 35 and 36, respectively. For instance, the cam 85 actuates the means (see fantom line 12) for actuating the projector 10 into the standby mode or into the project mode. Similarly, the cam 86 actuates the means (see fantom line 13) for actuating the projector 10 into the fast forward mode. The cam 87 operates the means (see fantom line 14) for actuating the projector 10 into the fast reverse mode.

Each of the levers 41, 45 and 49 carries an actuating disc 91, 92 and 93, respectively, by means of which the associated lever may be actuated.

Since these discs are rotary devices, any of a considerable variety of means may be employed for actuating the levers 41, 45 and 49.

By way of example, and not by way of limitation, FIG. 3 shows an air pressure device 94 for remotely actuating the lever 49. This remote control device has a cylinder block 95 in which a piston 96 is biased away from an air conveyance tube 97 by a spring 98. A push button 99 enables manual actuation of the remote control device. In particular, depression of the push button 99 moves the piston 96 toward the air tube 97 against the bias of the spring 98. This creates a pressure head in a cylinder block 100, depressing a piston 102 against the bias of a spring 103. This brings a plunger 105 to bear against the disc 93 of the lever 49. In consequence, the lever 49 is brought within reach of the rotating actuator 23 for engagement by one of the actuator wings 31 and 32.

Cylinder block devices 107 and 108, similar to the cylinder block device 100, may be provided for actuating the levers 41 and 45 by way of the discs 91 and 92, respectively, by way of plungers 109 and 110 which correspond to the plunger 105. Each of the cylinder block devices 107 and 108 has its individual air pressure tube, corresponding to the tube 94, connected thereto. Also, a push button of the type of push button 99, a piston of the type of piston 96, and a bias spring of the type of spring 98 is provided for the remote control of each cylinder block device 107 and 108. In FIG. 1, the air pressure line for the cylinder block device 100 is symbolized by a line 94. The air pressure line for the cylinder block device 107 is symbolized by a line 113, and the air pressure line for actuation of the cylinder block device 108 is symbolized by a line 114. A block 99 in FIG. 1 symbolizes the means for creating air pressure in the line 94 and cylinder block device 100. Similarly, blocks 116 and 117, respectively, symbolize means for creating air pressure in the line 113 and cylinder block 107 and air pressure in the line 114 and cylinder block device 108.

In actual practice, the actuating devices 99, 116 and 117 may be unified into an integral cylinder block defining the three requisite cylinders for remotely controlling the levers 41, 45 and 49. Similarly, the air pressure lines 94, 113 and 114 may be part of a band defining three separate tubular conduits. These are commercially available. By the same token, the cylinder blocks, 100, 107 and 108 may be unified to an integral cylinder block device 120 shown in part in FIG. 4.

In accordance with principles of the subject invention, the gear wheels 38, 39, 43, 44, 47 and 48 have bald portions free of gear teeth. In other words, only part of the circumference of these gear wheels are covered by gear teeth.

Figure 2:
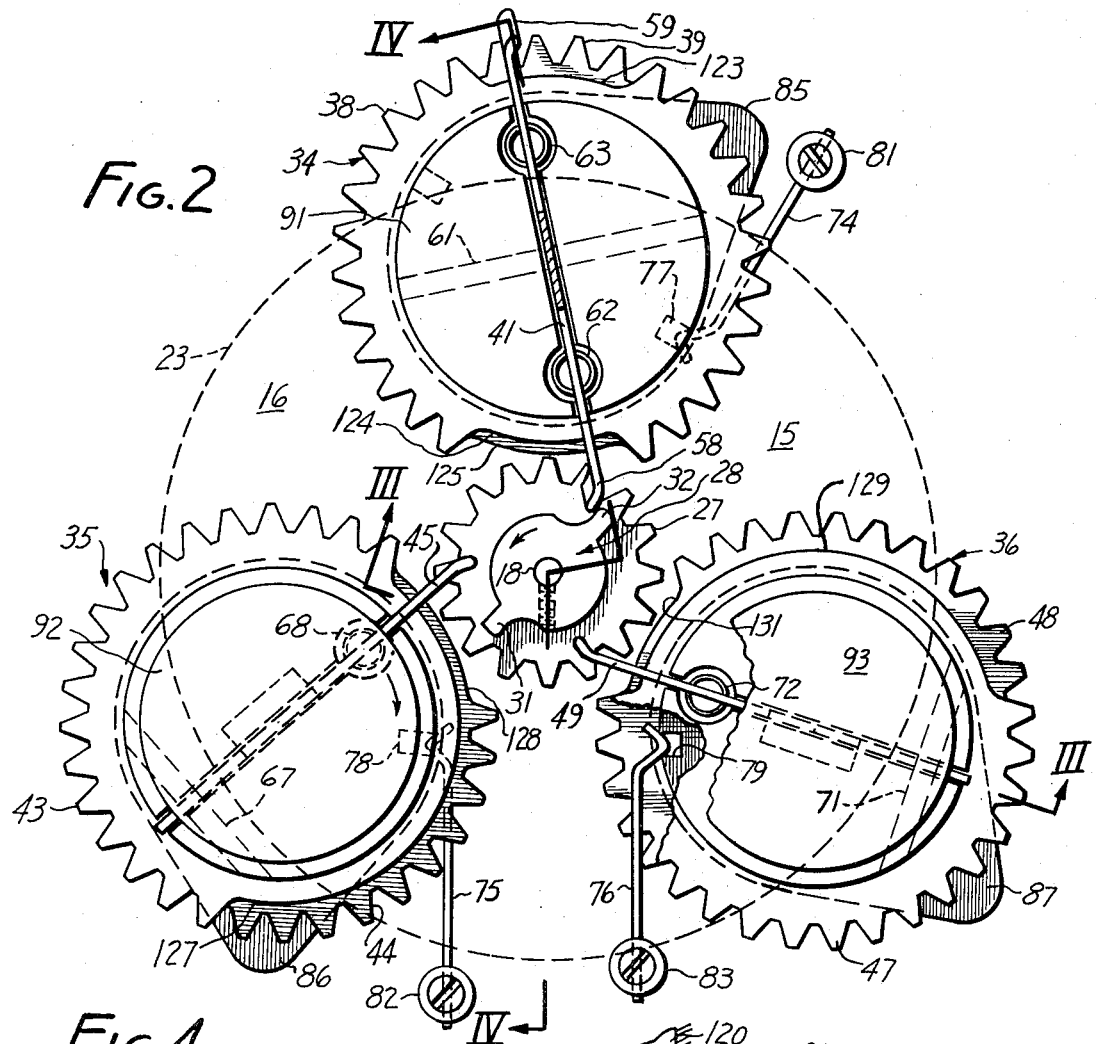
FIG. 2 is a top view of the control mechanism of FIG. 1.

As seen in FIG. 2, the gear wheel 38 has two bald portions 123 and 124. The gear wheel 39 has a bald portion 125 in registration with the bald portion 124 of the gear wheel 38. In the illustrated preferred embodiment, each of the bald portion 123, 124 and 125 occupies the equivalent of four gear teeth.

As also seen in FIG. 2, the gear wheel 43 has a bald portion 127 occupying the equivalent of about sixteen gear teeth. The gear wheel 44 has a bald portion 128 being in registration with part of the bald portion 127 and occupying the equivalent of about four missing gear teeth. The gear wheels 47 and 48 have bald portions 129 and 131 corresponding in size and relative position to the bald portions 127 and 128, respectively, of the gear wheels 43 and 44.

The gear wheels 38, 43 and 47 may be considered setting wheels which are rotated to predetermined positions upon actuation of the levers 41, 45 and 49, respectively. The gear wheels 39, 44 and 48 may be considered as resetting wheels which reset the units 34, 35 and 36 with the aid of an idler gear wheel 133. The idler gear wheel 133 rotates about the shaft 18 when driven by any of the gear wheels 39, 44 and 48.

Different phases in the operation of the control mechanism 15 will now be described with the aid of FIGS. 1 to 4.

Initially, the gear wheels are in the respective positions shown in FIG. 2, with the driven gear 27 and the actuator 28 rotating continuously. Because of the presence of the bald gear wheel portions 124, 127 and 129 the continuously rotating driver gear 107 is not capable of engaging any of the gear wheels 38, 43 and 47 of its own motion. Similarly, the idler gear 133 is then out of engagement with the gear wheels 39, 44 and 48 because of the presence of the bold portions 125, 128 and 131.

To place the projector 10 into the project mode, the plunger 109 is remotely actuated to depress the disc 91. This moves the wing 58 of the lever 41 into the rotational trajectory of the actuator 28. Accordingly, one of the wings, such as the wing 32 of the rotating actuator 28 will engage the lever portion 58, rotating the gear wheel set 34 clockwise as seen in FIG. 2. This rapidly moves the bald portion 124 past the driver gear 27, thereby placing a toothed portion of the gear wheel 38 into meshing engagement with the driver gear 27. Due to the present of the bald portion 123, the driver gear 27 can rotate the gear wheel 38 for only about half a revolution. This suffices, however, for an actuation of the projector 10 by the cam 85 into the project mode for a projection of a motion picture feature. Also, the toothed portion of the gear wheel 39 is thereby brought into meshing engagement with the idler gear wheel 133.

By way of example, we may now assume that the operator desires to put the projector 10 into the fast forward mode. To this effect, he actuates the control 117 for an extension of the plunger 110. This acts on the discs 92 for a depression of the lever 45.

The free end portion of the lever 45 is thus brought into the rotational trajectory of the actuator 28. One of the wings 31 and 32 of the actuator will, therefore, engage the lever 45 and rotate the gear wheel unit 35 clockwise as seen in FIG. 2. This brings the tooth portions of the gear wheels 43 and 44 into meshing engagement with the driver gear 28 and the idler gear wheel 133, respectively. Accordingly, the clockwise rotation of the unit 35 continues until a portion of the bald area 127 has been moved adjacent the driver gear 27. During this rotation of the unit 35, the gear wheel 44 of the unit 35 drives the gear wheel 39 of the unit 34 by way of the idler 133. This rotates the unit 34 by half a revolution, thereby causing the cam 85 to deactivate the project mode of the projector 10. In other words, the projection of the motion picture is terminated in favor of the fast forward mode in which the motion picture film is rapidly advanced in the forward direction.

The fast forward mode as such is activated by the cam 86 upon rotation of the gear wheel unit 35 in the manner just described.

In order to return the projector 10 to the project mode, the control 116 is actuated to depress the lever end 59 into the rotational trajectory of the actuator 28. One of the actuator wings 31 and 32 will then engage the lever portion 59 and will rotate the gear wheel unit 34 clockwise as seen in FIG. 2. This will bring a toothed portion of the gear 34 into meshing engagement with the driver gear 27 and the toothed portion of the gear wheel 39 into meshing engagement with the idler 133. The idler, is thus rotated and, in the last-mentioned position of the gear wheel unit 35, will rotate that unit to cause the cam 86 to remove the projector 10 from the fast forward mode. At the same time, the gear wheel unit 34 is returned to the position shown in FIG. 2, for the project-mode.

As a convenient feature of the illustrated preferred embodiment, the projector 10 can always be operated between the project and standby modes at the will of the operator by a simple actuation of the control 116. Let us now suppose that the operator wishes to place the projector 10 from the standby mode into the fast reverse mode. To this end, the operator actuates the control 99 which places the lever 49 into the rotational trajectory of the actuator 28. The resulting engagement of the free end of the lever 49 by one of the actuator wings 31 and 32 will rotate the gear wheel unit 36 clockwise as seen in FIG. 2. This places the toothed portions of the gear wheels 47 and 48 into meshing engagement with the driver gear 27 and idler gear 133, respectively. The unit 36 is thus rotated by part of a revolution until the cam 87 has placed the projector 10 into the fast reverse mode and until the driver gear 27 again encounters the bald portion 129. Since the gear wheel 48 is now in meshing engagement with the idler 133, the projector may now be placed into the project mode or standby mode, as desired, by actuation of the control 116. This will cancel the fast reverse mode, since the gear wheel 39 will rotate the gear 48 by way of the idler 133. Of course, the operator may also place the projector 10 from the fast reverse mode directly into the fast forward mode. To this end, the operator actuates the control 117. This depresses the free end of the lever 45 into the rotational trajectory of the actuator 28, which results in a clockwise rotation of the gear wheel unit 35. In consequence, the toothed portions of the gear wheels 43 and 44 will be moved into meshing engagement with the driver gear 27 and idler gear 133, respectively. The gear 44 will thus drive the gear 48 by way of the idler 133, thereby causing the cam 87 to cancel the fast reverse mode. At the same time, the cam 86 will be displaced by the rotating unit 35 to place the projector into the fast forward mode.

It will thus be recognized that the control mechanism of the subject invention enables the projector 10 to be actuated from any mode into any other mode by a simple command pertaining to such other mode. In other words, any new command will cancel the then existing mode of operation, in a addition to initiating the desired new mode of operation.

It will also be recognized that the subject invention lends itself to the effectuation of a large variety of control tasks.

A further preferred embodiment of the subject invention will now be disclosed with the aid of FIGS. 5 to 9.

In particular, the control mechanism of FIGS. 5 to 9 may be employed as a tune selector in conjunction with the systems disclosed in the above mentioned Peterson, Cooper et al, and Rak patents incorporated by reference herein. Briefly, a tune selector of this type enables the owner or user of a series of prerecorded tunes to select specific tunes for replay and to modify such selection from time to time.

By way of example, FIGS. 5 and 6 show outlines of a magnetic recording tape cassette 200 which, in a conventional manner, contains a magnetic recording tape (not shown) having a series of features, such as musical or vocal renditions, prerecorded thereon. By way of example, it is assumed that eight features are recorded in a channel of the recording tape in the cassette 200. In actual practice, features are typically prerecorded in more than one channel, but, for clarity of illustration and in avoidance of duplication, only one channel is dealt with in this disclosure.

To provide the user of the cassette with a means for effecting tune or feature selections, the cassette 200 carries a band 201 having eight devices 202 to 209. By way of example, the band 201 may be made of a plastic material out of which the devices 202 to 209 are formed. A series of like devices may be formed on the other side of the band 201 if further tunes are recorded on the magnetic tape inside the cassette and if such further tunes are to be selectively replayed after the cassette 200 has been flipped over from the position shown in FIG. 5.

The devices 202 to 209 form a register 211 for effecting variable selections of features for replay. To register a selection, the operator manually adjusts the devices 202 to 209 so that the devices that correspond to features scheduled for replay are in the position shown in FIG. 6 for the devices 202, 204, 205, 207, 208, and 209, while the devices that correspond to features which are scheduled for bypass are in the position shown in FIG. 6 for the devices 203 and 206. In other words, the first, third, fourth, sixth, seventh, and eighth features in the cassette 200 are scheduled for replay in the embodiment shown in FIG. 6, while the second and fifth features are scheduled for bypass at fast forward speed. Of course, this selection is variable, as each device can be adjusted to occupy either of the two positions depending on whether a replay or a bypass of the feature corresponding to such device is contemplated.

The apparatus of FIGS. 5 to 9 has equipment for sequentially sensing the position of the adjustable devices 202 to 209. As seen in FIGS. 5, 6 and 8, the sensing equipment 213 has a finger 214 for sensing the position of the selector devices 202 to 209. A stationary retaining member 215 holds the sensing finger 214 in position preparatory to a sensing operation.

The sensing finger 214 is mounted on a carriage 217 which rides on a shaft 218 having a rectangular cross-section for a transmission of torque from the sensing finger 214 to the shaft 218. An actuating lever 219 is attached to the shaft 218 by a rod 220. A spring 223 is attached to the actuating lever 219 and a chassis portion 224 to bias the sensing finger 214 in a clockwise direction as seen in FIG. 8. A cable pull 226 has a cable 227 wound on a drum 228 and biased by a spring 229. The cable 227 runs about an idler pulley 231.

A sensing operation is initiated by a depression of the lever 232. As shown in FIG. 6, the lever 232 may be depressed electromechanically by a solenoid 333 which is energized by a pair of leads 334 by a control 335 whenever a playback head 336 senses a control signal on the recording tape contained in the cassette 200 and generates a corresponding electrical signal in a pair of leads 338 connected to the control 335. As shown in the above mentioned Peterson, Cooper et al, and Rak patents, control signals indicating the beginnings and/or ends of the recorded features may be provided on the recording tape to initiate a feature selector sensing operation.

As further disclosed in the above mentioned Peterson and Cooper at al patents, and in the allowed Patent Application Ser. No. 127,263, filed on Mar. 23, 1971, by Leonard A. Ferrari, now U.S. Pat. No. 3,723,666 means may be employed for sensing pauses ahead of and between recorded features, so as to render the recording of control signals unnecessary. The allowed Ferrari patent application is assigned to the subject assignee and is herewith incorporated by reference herein. In the preferred embodiment shown herein in FIGS. 5 to 9, cause sensing equipment may be incorporated in the control 335 and a special control signal playback head may then be dispensed with. However, to facilitate the subject disclosure, the assumption is herewith made that a control signal sensing head 336 is employed for initiating and controlling sensing operations.

As before, the control mechanism has a driver gear 27 and a rotary actuator 28 with actuator wings 31 and 32. A motor 19 continuously rotates the driver gear 27 and the actuator 28 by way of a shaft 18, pulleys 21 and 23 and drive belt 22.

The control mechanism further includes a gear wheel set 235 and a gear wheel set 236. The gear wheel set 235 has three gear wheels 237, 238 and 239 which are formed as an integral unit. The gear wheel unit 236 has two gear wheels 241 and 242 and a cam 243 which are also formed as an integral unit. As seen in FIGS. 5 and 7, detents 245 and 246, mounted on a post 247, cooperate with depressions 248 and 249 to releasably retain the gear wheel units 235 and 236 in their positions shown in FIGS. 5 to 7.

The gear wheel 237 has a bald or tooth-less portion 251 and the gear wheel 241 has a bald portion 252. These bald portions 251 and 252 prevent the driver gear 27 from engaging either of the gear wheels 237 and 241 when the units 235 and 236 are retained in their illustrated positions by the detents 245 and 246.

At the beginning of a replay operation, the magnetic head 336 senses the imminent beginning of the first recorded feature on the magnetic tape in the cassette 200. The resulting signal generated in the head winding is applied by the leads 338 to the control 335. The control, in turn, energizes the solenoid 333 by way of the leads 336. The control 335 may basically be of a simple nature, including a playback amplifier for amplifying the signal generated by the head 336 and a relay, energized by the playback amplifier, for temporarily connecting the solenoid 333 to a source of electric power (not shown). The energized solenoid 333 depresses the lever 232 of the gear wheel unit 235 against the bias of a spring 254. The lever 232 is pivotally mounted in the unit 235 by a pin 255. Accordingly, the free end of the lever 232 is brought into the rotary trajectory of the wings 31 and 32 of the rotary actuator 28.

One of the wings 31 and 32 of the rotary actuator 28 will catch the free end of the lever 232 and will rotate the gear wheel unit 235 clockwise as seen in FIGS. 6 and 7. This will place the toothed portion of the gear wheel 237 into meshing engagement with the driver gear 27, continuing the clockwise rotation of the gear wheel unit 235. In consequence, the relatively short toothed portion of the gear wheel 239 of the unit 235 will move into meshing engagement with a gear wheel 256 which, as seen in FIG. 5 is integral with the cable drum 228. As seen in FIGS. 5 and 7, the gear wheel 239 of the unit 235 has a large bald portion 257. Accordingly, rotation of the gear wheel unit 235 by one revolution will only result in sufficient rotation of the cable drum 228 to pull the sensing finger 214 from the initial position shown in FIG. 6 to the first selector device 202 or, at a later stage of the operation, from one selector device to the next.

A ratchet wheel 259, which is integral with the cable drum 228 and a pawl 261 cooperate in retaining the sensing finger 214 in each sensing position to which it has been advanced by rotation of the gear wheel unit 235. The pawl 261 is pivotally mounted at 263 and is biased by a spring 264 into engagement with the teeth of the ratchet will 259. The spring 264 acts on the pawl 261 by way of a rod 265.

The first revolution of the gear wheel 235 in the manner just described results in an advancement of the sensing finger 214 from the initial position at the bracket 215 to the first selector device 202. Since the first selector device 202 is in its forward position, the actuating lever 219 at the gear wheel unit 236 remains in its upward position, which is the case when a playback of the particular feature is desired. Accordingly, the first feature recorded in the cassette 202 will be audibly reproduced in the manner indicated in the above mentioned Peterson, Cooper et al and Rak patents. In general, conventional playback equipment, including a playback head similar to the head 336, a playback amplifier and loudspeaker equipment, may be employed for this purpose.

The next rotation of the gear wheel unit 235 occurs when the magnetic head 336, after replay of the first feature senses the imminent beginning of the second feature recorded in the cassette 200. At that instance, the control 335 energizes the solenoid 333 to again depress the lever 232 into engagement with the rotary actuator 28.

In this manner, the gear wheel unit 235 is again rotated by one revolution, causing advancement of the sensing finger 214 from the selector device 202 to the selector device 203 pertaining to the second recorded feature. Since the operator has manually actuated the selector device 203 to its retracted position in the example shown in FIG. 6, the sensing finger 214 is now free to swing to its advanced position shown in dotted outline at 271 in FIG. 8. Accordingly, the spring 223 is now capable of pulling the actuating lever 219 downwardly, thereby depressing a lever 272 of the gear wheel unit 236 against the bias of a spring 273. The lever 272 is pivotally mounted on the unit 236 by a pin 275.

In this manner, the free end of the lever 272 of the unit 236 is moved into the rotary trajectory of the wings 31 and 32 of the rotary actuator 28. The actuator 28 thus rotates the unit 236 in a clockwise direction as seen in FIGS. 6 and 7, bringing the toothed portion of the gear wheel 241 into meshing engagement with the driver gear 27. The clockwise rotation of the unit 236 thus continues for about one-half revolution, at which point further rotation stops for the time being because of the presence of the bald portion 277 of the gear wheel 241.

As mentioned above the gear wheel unit 236 has a cam 243. This cam cooperates with a cam follower 278 in moving a lever 279 from the solidly illustrated position shown in FIG. 7 to an advanced position shown in dotted outline at 281. The lever 279 is pivoted at 282 and is connected to the cam follower 278 by a link 283 articulately attached to the lever 279 by a pin 284. Also, the lever 279 is biased to its solidly illustrated position by a spring 286.

The lever 279 is advanced against the bias of the spring 286 from the solidly illustrated position to the advanced position shown at 281 in response to about one-half revolution of the gear wheel unit 236. As indicated by a fantom line 287, the lever 279 acts on a tape drive control 289 which may be of the type disclosed in the above mentioned Peterson, Cooper et al, and Rak patents. Briefly, the tape drive control is of a bistable nature, effecting advancement of the magnetic tape in the cassette 200 at playback speed when the lever 279 is in its solidly illustrated position shown in FIG. 7, and effecting advancement of the recording tape at fast forward speed when the lever 279 is in its advanced position shown at 281.

In consequence, the recording tape will be advanced at fast forward speed in response to the position of the selector device 203 shown in FIG. 6 and in response to the resulting one-half revolution of the gear wheel unit 236. As described, for instance, in the above mentioned Peterson patent, the playback sound system may be deactivated during fast forward advance of the recording tape.

The solenoid 333 again depresses the lever 232 when the magnetic head 336 senses the imminent beginning of the third recorded feature in the cassette 200. Because of the previous one-half revolution of the gear wheel unit 236, the toothed portion of the gear wheel 242 adjacent the bald portion 291 of that gear wheel is now in meshing engagement with an idler gear 292 rotatably mounted on a shaft 293 which is attached to the baseplate 16 shown in FIG. 5. Accordingly, the gear wheel unit 236 is rotationally reset to its initial position shown in FIGS. 5 to 7, when the toothed portion of the gear wheel 238 of the rotating unit 235 engages the idler gear 292. Rotation of the gear wheel unit 235 continues until the bald portion 294 of the gear wheel 238 has been located adjacent the idler gear 292 as shown in FIG. 7.

The tip of the cam 243 of the unit 236 has thus been moved beyond the cam follower 278, so that the lever 279 is illustrated to its solidly illustrated position shown in FIG. 7. Accordingly, the tape drive control effects advancement of the recording tape at playback speed preparatory to each sensing operation. This has the advantage of permitting sensing of control markings or of pauses between features at playback speed. This considerably lessens the danger that the magnetic head 336 would mistakenly respond to spurious signals or that a pause sensing device would respond to pauses within a recorded feature.

The control mechanism shown in FIGS. 5 to 9 will operate in the above mentioned manner to effect a playback of the third, fourth, sixth, seventh, and eighth recorded features, since the selector devices 204, 205, 207, 208, and 209 are in their forward position. On the other hand, the lever 219 and gear wheel unit 236 will again operate in the above mentioned manner to effect bypass of the fifth recorded feature at fast forward speed since the selector device 206 is in its depressed position as shown in FIG. 6. In order to inform the operator which feature is being replayed or bypassed at any given instance, a dial 297 with numerals as shown in FIG. 7 may be provided integrally with the ratchet wheel 259 and cable drum 228.

The sensing finger 214 may at any time be returned to its illustrated position preparatory to a removal of a cassette 200 by a depression of the pawl 216 in the direction of the arrow 299 shown in FIG. 6. At that instance, the rod 265 is moved against the bias of the spring 264 and the tip of the pawl 261 is moved out of engagement of the teeth of the ratchet wheel 259. At the same time, an extension of the rod 265 in the form of a nose portion 300 shown in FIGS. 6 and 9 is temporarily moved under the actuating lever 219 so as to prevent the spring 223 from moving this actuating lever downwardly when the sensing finger 214 is returned to its illustrated initial position by action of the spring 229. The ratchet wheel 259 has a flap 301 which is caught by the tip of the depressed pawl 261 when the finger 214 has been returned to its initial position at the bracket 215.

The pawl 261 is then released to the position shown in FIG. 6, and a new tape cassette with appropriately adjusted selector devices may then be inserted into the playback apparatus for a reproduction of selected prerecorded features.

Modifications and variations within the spirit and scope of the subject invention will become apparent from the subject disclosure to those skilled in the art.

I claim:

1. Apparatus for selectively transmitting mechanical power, comprising in combination:
   a first gear wheel;
   a second gear wheel having a tooth-free portion;
   means for driving the first gear wheel;
   means for deriving mechanical power from the second gear wheel;
   means for mounting the second gear wheel adjacent the first gear wheel for meshing engagement; and
   actuable means for selectively bringing the second gear wheel into meshing engagement with the first gear wheel, said actuable means including means for selectively coupling the second gear wheel to said means for driving the first gear wheel.

2. Apparatus as claimed in claim 1, wherein:
said means for selectively coupling the second gear wheel to said driving means includes means for selectively coupling the second gear wheel to said driving means by way of the first gear wheel.

3. Apparatus as claimed in claim 1, wherein:
said actuable means for selectively bringing the second gear wheel into meshing engagement with the first gear wheel include a first member coupled to said means for driving the first gear wheel, a second member coupled to said second gear wheel, means for selectively moving said second member into engagement with said first member, and means for alternatively moving said second member out of engagement with said second member.

4. Apparatus as claimed in claim 1, wherein:
said actuable means for selectively bringing the second gear wheel into meshing engagement with the first gear wheel include rotary actuator means coupled to said means for driving the first gear wheel, a lever connected to the second gear wheel, means for selectively moving said lever into engagement with said rotary actuator means, and means for biasing said lever out of engagement with said rotary actuator means.

5. Apparatus as claimed in claim 4, wherein:
said lever is pivotally mounted on said second gear wheel.

6. Apparatus as claimed in claim 4, including:
means for releasably retaining said lever adjacent said rotary actuator means.

7. Apparatus for selectively transmitting mechanical power, comprising in combination:
   a first gear wheel;
   a second gear wheel having a tooth-free portion;
   a third gear wheel having a tooth-free portion;
   means for driving the first gear wheel;
   means for deriving mechanical power from the second gear wheel;
   means for deriving mechanical power from the third gear wheel;
   means for mounting the second gear wheel adjacent the first gear wheel for meshing engagement of the second gear wheel with the first gear wheel;
   means for mounting the third gear wheel adjacent the first gear wheel for meshing engagement of the third gear wheel with the first gear wheel;
   first actuable means for selectively bringing the second gear wheel into meshing engagement with the first gear wheel;
   second actuable means for selectively bringing the third gear wheel into meshing engagement with the first gear wheel; and
   means coupled between said second and third gear wheels for selectively transmitting mechanical power between said second and third gear wheels.

8. Apparatus as claimed in claim 7, wherein:

said first actuable means include means for selectively coupling the second gear wheel to said means for driving the first gear wheel; and said second actuable means include means for selectively coupling the third gear wheel to said means for driving the first gear wheel.

9. Apparatus as claimed in claim 7, wherein:

said first and second actuable means jointly include a first member coupled to said means for driving the first gear wheel;

said first actuable means further include a second member coupled to the second gear wheel, means for selectively moving said second member into engagement with said first member, and means for alternatively moving said second member out of engagement with said first member; and said second actuable means further include a third member coupled to the third gear wheel, means for selectively moving said third member into engagement with said first member, and means for alternatively moving said third member out of engagement with said first member.

10. Apparatus as claimed in claim 7, wherein:

said first and second actuable means jointly include rotary actuator means coupled to said means for driving the first gear wheel;

said first actuable means further include a first lever connected to the second gear wheel, means for selectively moving said first lever into engagement with said rotary actuator means, and means for biasing said first lever out of engagement with said rotary actuator means; and said second actuable means further include a second lever connected to the third gear wheel, means for selectively moving said second lever into engagement with said rotary actuator means, and means for biasing said second lever out of engagement with said rotary actuator means.

11. Apparatus as claimed in claim 10, wherein:

said first lever is pivotally mounted on said second gear wheel; and said second lever is pivotally mounted on said third gear wheel.

12. Apparatus as claimed in claim 7, wherein:

said means for selectively transmitting mechanical power between the second and third gear wheels include an idler gear wheel, a fourth gear wheel having a tooth-free portion, being connected to the second gear wheel and positioned for meshing engagement with the idler gear wheel, and a fifth gear wheel having a tooth-free portion, being connected to the third gear wheel and positioned for meshing engagement with the idler gear wheel.

13. Apparatus as claimed in claim 12, including:

a sixth gear wheel having a tooth-free portion;

means for deriving mechanical power from the sixth gear wheel;

means for mounting the sixth gear wheel adjacent the first gear wheel for meshing engagement of the sixth gear wheel with the first gear wheel;

third actuable means for selectively bringing the sixth gear wheel into meshing engagement with the first gear wheel; and a seventh gear wheel having a tooth-free portion, being connected to the sixth gear wheel and positioned for meshing engagement with said idler gear means.

14. Apparatus as claimed in claim 7, for sensing the position of a plurality of adjustable devices and for controlling equipment, including:

means for sequentially sensing the position of said plurality of adjustable devices;

means for advancing said sensing means from adjustable device to adjustable device;

means for coupling said advancing means to said means for deriving mechanical power from the second gear wheel;

means operatively associated with said first actuable means for initiating a sensing action;

means for selectively coupling said sensing means to said second actuable means; and means for controlling said equipment by way of said means for deriving mechanical power from the third gear wheel.

15. Apparatus as claimed in claim 14, wherein:

said means for selectively transmitting mechanical power between the second and third gear wheels include a fourth gear wheel for resetting the third gear wheel, the fourth gear wheel having a tooth-free portion and being connected to the second gear wheel, an idler gear wheel positioned for meshing engagement with the fourth gear wheel, and a fifth gear wheel having a tooth-free portion, being connected to the third gear wheel and positioned for meshing engagement with the idler gear wheel.

16. Apparatus as claimed in claim 15, wherein:

said means for advancing said sensing means include cable pull means having a cable connected to said position sensing means, a cable drum for winding said cable, and means for rotating said cable drum with said means for deriving mechanical power from said second gear wheel.

17. Apparatus as claimed in claim 16, wherein:

said means for advancing said sensing means include ratchet means connected to said cable drum for releasably retaining said position sensing means in each advanced position.

18. Apparatus as claimed in claim 15, wherein:

said first and second actuable means jointly include a first member coupled to said means for driving the first gear wheel;

said first actuable means further include a second member coupled to the second gear wheel, means for selectively moving said second member into engagement with said first member, and means for alternatively moving said second member out of engagement with said first member; and said second actuable means further include a third member coupled to the third gear wheel, means for selectively moving said third member into engagement with said first member, and means for alternatively moving said third member out of engagement with said first member.

19. Apparatus as claimed in claim 18, wherein:

said means for selectively moving said third member into engagement with said first member include actuating means coupled to said position sensing means.

20. Apparatus as claimed in claim 15, wherein:

said first and second actuable means jointly include rotary actuator means coupled to said means for driving the first gear wheel;

said first actuable means further include a first lever connected to the second gear wheel, means for selectively moving said first lever into engagement with said rotary actuator means, and means for biasing said first lever out of engagement with said rotary actuator means; and said second actuable means further include a second lever connected to the third gear wheel, means for selectively moving said second lever into engagement with said rotary actuator means, and means for biasing said second lever out of engagement with said rotary actuator means.

21. Apparatuas as claimed in claim 20, wherein:

said means for selectively moving said second lever into engagement with said rotary actuator means include actuating means coupled to said position sensing means.

* * * * *